(12) United States Patent
Hesselink (10) Patent No.: US 10,289,809 B1
(45) Date of Patent: May 14, 2019

(54) TRANSFERRING MEDIA FILES BETWEEN USERS AFTER ENCRYPTING WITH ENCRYPTION KEY OBTAINED FROM A DIGITAL RIGHTS MANAGEMENT SERVER

(75) Inventor: Lambertus Hesselink, Atherton, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 1820 days.

(21) Appl. No.: 12/781,365

(22) Filed: May 17, 2010

(51) Int. Cl.
| | |
|---|---|
| *H04N 21/254* | (2011.01) |
| *G06F 21/10* | (2013.01) |
| *H04L 9/14* | (2006.01) |
| *H04L 29/06* | (2006.01) |
| *G06Q 99/00* | (2006.01) |
| *G06Q 20/12* | (2012.01) |

(52) U.S. Cl.
CPC ......... *G06F 21/10* (2013.01); *G06Q 20/1235* (2013.01); *H04L 9/14* (2013.01); *H04L 63/045* (2013.01); *H04L 63/0428* (2013.01); *H04L 63/06* (2013.01); *H04N 21/2541* (2013.01); *H04L 2209/603* (2013.01); *H04L 2463/101* (2013.01)

(58) Field of Classification Search
CPC ............... G06F 21/10; H04N 21/8335; H04N 21/2541; H04L 2463/101; G07F 11/002
USPC .......................................................... 726/31
See application file for complete search history.

(56) References Cited

U.S. PATENT DOCUMENTS

| | | | | |
|---|---|---|---|---|
| 7,249,107 B2* | 7/2007 | Yaacovi | ................ | G06F 21/10 705/51 |
| 7,500,269 B2* | 3/2009 | Huotari | ................ | H04L 63/08 713/153 |
| 8,037,541 B2* | 10/2011 | Montague | ............... | G06F 21/10 380/200 |
| 8,099,762 B2* | 1/2012 | Valenti | ................ | H04L 9/0827 713/150 |
| 8,280,818 B2* | 10/2012 | Ebihara | ................ | G06F 21/10 705/59 |
| 8,321,954 B2* | 11/2012 | Mostafa | ................ | H04L 51/24 726/27 |
| 8,572,752 B2* | 10/2013 | Ma | ........................ | G06F 21/10 705/51 |
| 8,572,753 B2* | 10/2013 | Rohan | ................... | G06Q 20/40 709/223 |
| 8,619,994 B2* | 12/2013 | Lee | ......................... | G06F 21/10 370/277 |
| 8,904,191 B2* | 12/2014 | Burns | .................... | G06F 21/10 713/193 |
| 2003/0018582 A1* | 1/2003 | Yaacovi | ................ | G06F 21/10 705/51 |
| 2004/0088541 A1* | 5/2004 | Messerges | ............ | G06F 21/10 713/156 |

(Continued)

*Primary Examiner* — Linglan E Edwards
(74) *Attorney, Agent, or Firm* — Knobbe, Martens, Olson & Bear LLP (57) ABSTRACT

A method is disclosed for transferring a media file from a first user device to a second user device. The first user device receives a first media file, and receives a first digital rights management (DRM) license from a DRM server corresponding to the first media file. The first user device encodes the first media file into a second media file using the first DRM license, and transfers the second media file to the second user device.

19 Claims, 7 Drawing Sheets

(56) References Cited

U.S. PATENT DOCUMENTS

| | | | |
|---|---|---|---|
| 2005/0117747 A1* | 6/2005 | Valenti | H04L 9/0827 380/44 |
| 2006/0173784 A1* | 8/2006 | Marples | G06F 21/10 705/52 |
| 2007/0086372 A1* | 4/2007 | Lee | G06F 21/10 370/328 |
| 2007/0219921 A1* | 9/2007 | Lee | G06F 21/10 705/59 |
| 2008/0040816 A1* | 2/2008 | Manning | G06F 21/10 726/31 |
| 2008/0103977 A1* | 5/2008 | Khosravy et al. | 705/59 |
| 2008/0109249 A1 | 5/2008 | Paulson et al. | |
| 2008/0256647 A1 | 10/2008 | Kim et al. | |
| 2009/0089177 A1 | 4/2009 | Dayton et al. | |
| 2009/0106393 A1 | 4/2009 | Parr et al. | |

\* cited by examiner

TRANSFERRING MEDIA FILES BETWEEN USERS AFTER ENCRYPTING WITH ENCRYPTION KEY OBTAINED FROM A DIGITAL RIGHTS MANAGEMENT SERVER

BACKGROUND

Figure 1:
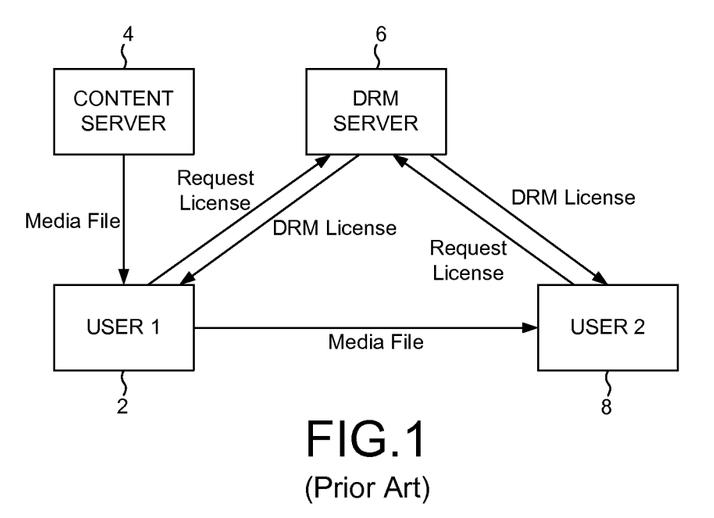
FIG. 1 shows a block diagram of a prior art technique wherein a first user device transmits a media file to a second user device without encrypting (or re-encrypting) the media file.

FIG. 1 shows a prior art technique for distributing and protecting media files. A first user device 2 requests and receives an encoded media file from a content server 4, and requests a corresponding digital rights management (DRM) license from a DRM server 6. The DRM license enables the first user device to decode and play the media file on a computer, television, cell phone, etc. The first user device 2 is also allowed to transfer the encoded media file to a second user device 8 using any conventional technique, such as email, Bluetooth, or a portable storage medium (e.g., flash card, CD, DVD, etc.). The second user device 8 then obtains a DRM license from the DRM server 6 in order to decode and play the encoded media file at its location.

DETAILED DESCRIPTION OF EMBODIMENTS OF THE INVENTION

Friends and family members often share similar interests and recommend books, music, movies, games, and other media files to one another. These word-of-mouth recommendations can be very valuable to the media content owners when these recommendations from one user turn into a second user purchasing, renting, or otherwise consuming such recommended media files. In order to reap the benefits of these recommendations, however, it is important that the content owners be able to control access to the media files. Content owners may be able to further increase the consumption of content by incentivizing users to share and recommend media files through a profit sharing or other reward system.

Figure 2A:
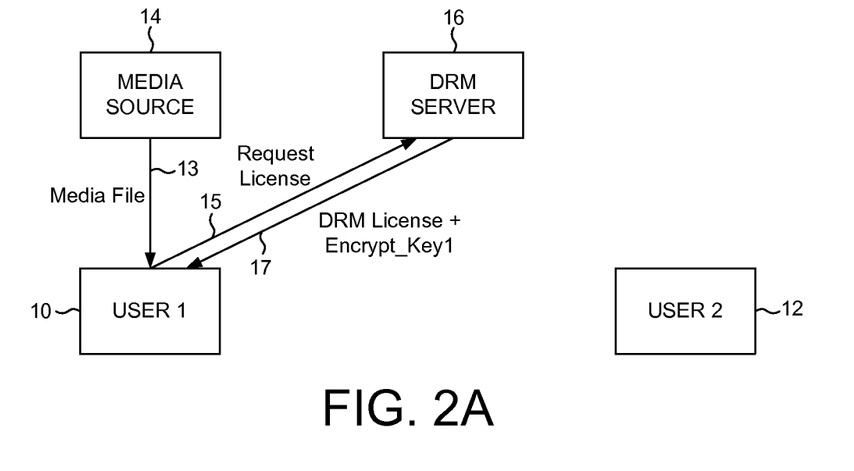
FIG. 2A shows a block diagram of an embodiment of the present invention wherein a first user device receives a first media file from a media server, and then requests and receives a first DRM license and a first encryption key corresponding to the first media file from a DRM server.
Figure 2B:
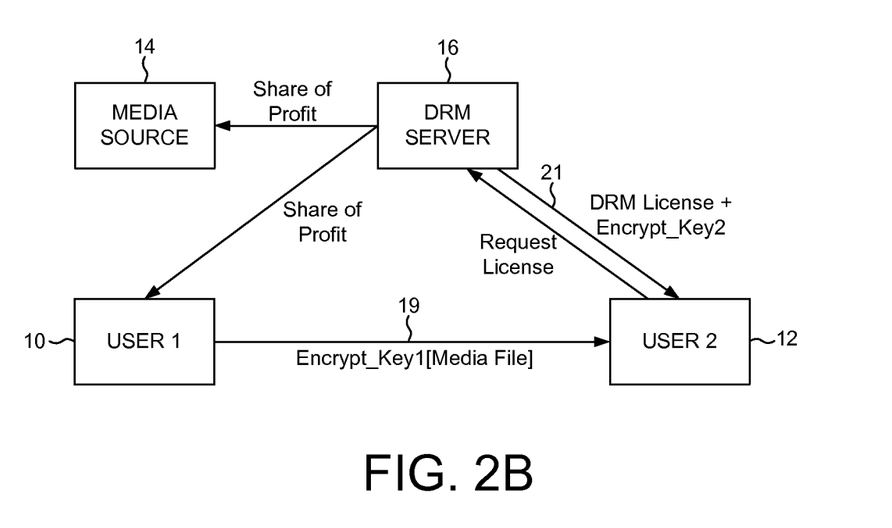
FIG. 2B shows a block diagram of an embodiment of the present invention wherein the first user device encodes the first media file using the first encryption key to generate a second media file transferred to a second user device that requests a second DRM license and a second encryption key corresponding to the second media file from the DRM server.
Figure 3A:
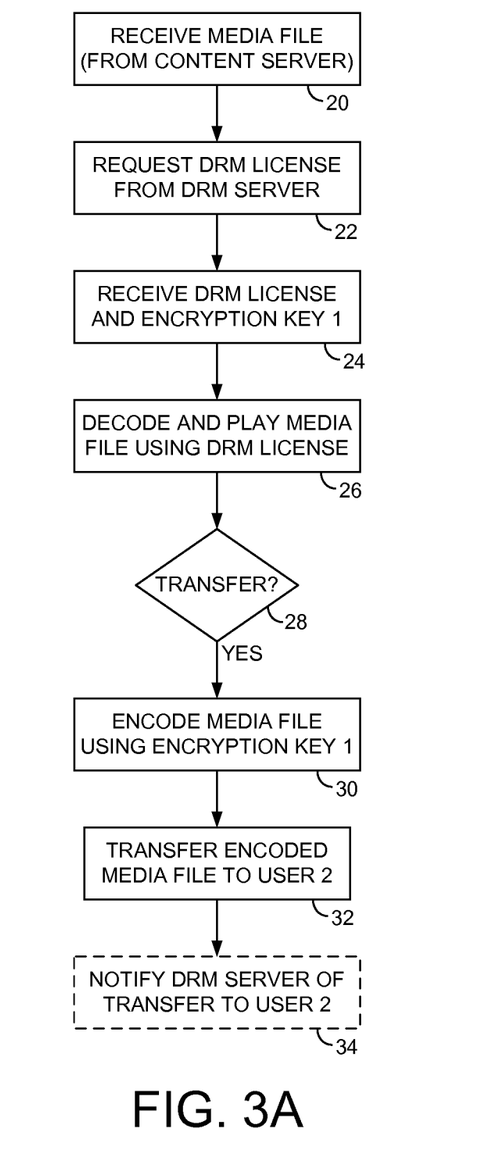
FIG. 3A is a flow diagram according to an embodiment of the present invention wherein a first user device encodes a first media file into a second media file for transmission to a second user device.

FIGS. 2A and 2B show an embodiment of the present invention for transferring a media file from a first user device 10 to a second user device 12 which is understood with reference to the flow diagram of FIG. 3A. The first user device 10 receives a first media file 13 from any suitable media source 14 such as a content server (block 20). The first user device 10 then requests a DRM license 15 from a DRM server 16 corresponding to the first media file 13 (block 22). The first user device 10 receives the DRM license together with a first encryption key 17 (block 24) and uses the DRM license 17 to decode and play the first media file 13 (block 26). When a transfer is desired (block 28), such as when the first user enjoys a movie and desires to recommend it to a friend, second user, the first user device 10 encodes the first media file using the first encryption key 17 to generate a second media file 19 (block 30) and transfers the second media file 19 to the second user device 12 (block 32). In one embodiment, the first user device 10 may optionally transmit an identifier to the DRM server 16 identifying the second user device 12 as a recipient of the second media file 19 and/or the first user 10 as the creator of the second media file (block 34).

In various embodiments of the present invention, the media file may comprise any suitable content, such as a music file, video file, and/or game file. The media source 14 in FIG. 2A may comprise any suitable source, such as a content server accessed over a network (e.g., the Internet), or any suitable storage medium such as a CD, DVD, Blu-ray, Flash card, USB drive, etc. The user devices in FIG. 2A may represent any suitable computing device capable of communicating with the DRM server 16, such as a desktop computer, laptop or tablet computer, server, music player, game player, DVD or Blu-ray player, cellular/smart phone or similar mobile device, television cable box, satellite box, a dedicated media device (such as the WD TV line of products commercially available from Western Digital Technologies, Inc., the assignee of this disclosure), kiosk, etc. Primarily the user devices 10, 12 must be adapted to connect to a communications network, such as, for example, a LAN, WAN, or the Internet for sending and receiving media files and/or communicating with the DRM server 16. In the embodiment of FIG. 2B, the first user device may transfer the second (encoded) media file 19 to the second user device using any suitable technique, such as over a network (e.g., Bluetooth or Internet), or with any suitable storage medium such as a CD, DVD, Blu-ray, Flash card, etc., or using any suitable direct cable connection such as Firewire or Universal Serial Bus.

Any suitable encryption algorithm and attendant encryption/decryption keys may be employed in the present invention, including any symmetric or asymmetric key encryption algorithm such as Rivest, Shamir and Adleman (RSA) or Diffie-Hellman. In some embodiments, the DRM license received from the DRM server includes a decryption key for decoding the media file associated with the request for the DRM license. For example, in the embodiments of FIGS. 2A and 2B, the first user device 10 receives a first decryption key with the DRM license 17 for decoding the first media file 14, and the second user device 12 receives a second decryption key with the DRM license 21 for decoding the second media file 19 received from the first user device 10. In some embodiments, these decryption keys may be location, device, or user specific to help prevent a user from transferring the media files 13, 19 and associated decryption keys to an unauthorized user or location, rather than requiring the new user to obtain his own decryption key. As just one example, a DRM license 17 and its first decryption key may be designed to only work when the first user device 10 has an IP address that matches or is in a certain range designated by the decryption key.

Each user device also receives an encryption key with the requested DRM license, wherein the encryption key is used to encode the received media file into a different version of the media file unique to the user device. The newly encoded media file is then transmitted to other user devices which must obtain a decryption key from the DRM server in order to decode the media file. When the DRM server receives a request for a DRM license, the request is evaluated to determine which user device encoded the media file, and therefore the appropriate decryption key needed to decode the media file.

In addition to media content (e.g., music, video, gaming, etc), the media files may include header information used by the DRM server 16 in order to manage distribution of encryption/decryption keys and to maintain a database of user information used to compensate the media sources, and in some embodiments, compensate the users responsible for distributing the media files to other users.

In some embodiments, a media source may register a media file with the DRM system by requesting an original encryption key from the DRM server, wherein the request may include information that identifies various aspects of the media file (e.g., type of content, owner, purchase price, free preview length or trailer, etc.). The media source encrypts the media file using the original encryption key and then distributes the media file using any suitable technique. In one embodiment, the media source may market the media file on one or more websites (e.g., Google, Amazon, YouTube, FaceBook, etc.) or by distributing the media file in an email campaign, or by mass distributing the media file on an inexpensive storage medium. Any user may obtain a copy of the media file, such as by downloading the media file from the Internet, receiving the media file in an email, or obtaining a copy on an inexpensive mass distributed storage medium, such as a CD, DVD, or Blu-ray. In one embodiment, the media file may include free content, such as a predetermined preview of the first few minutes of a movie, or few seconds of one or more songs, or a movie trailer. If after viewing the free content a user desires to purchase the media file, the user sends a request to the DRM server (e.g., over the Internet) to purchase a DRM license used to decode the media file.

In one embodiment, when a user contacts the DRM server and identifies a media file for purchase, the header information of the media file is transmitted from the user to the DRM server. The DRM server evaluates the header information to determine the appropriate decryption key as well as the media source, and updates the appropriate transaction databases to credit the media source for the purchase. This provides a convenient vehicle for content providers to generate revenue through the mass distribution of media files. Another significant aspect of the present invention is the ability for users to participate in the distribution process and receive compensation for sales transactions to third parties down the distribution line.

As described above, when a first user device requests from the DRM server a DRM license corresponding to a first media file received from a media source, the first user device also receives a unique encryption key from the DRM server. The first user device uses the encryption key to encode the first media file into a second (encoded) media file that can only be decoded using a decryption key obtained from the DRM server that is associated with the first user. The first user may then transfer the second media file to a second user, wherein the second user may only decode the second media file by purchasing a DRM license (including the decryption key) from the DRM server. Once the second user obtains the DRM license, the second user may decode and play the second media file, as well as encode the second media file to generate a third media file for transfer to other users.

Figure 3B:
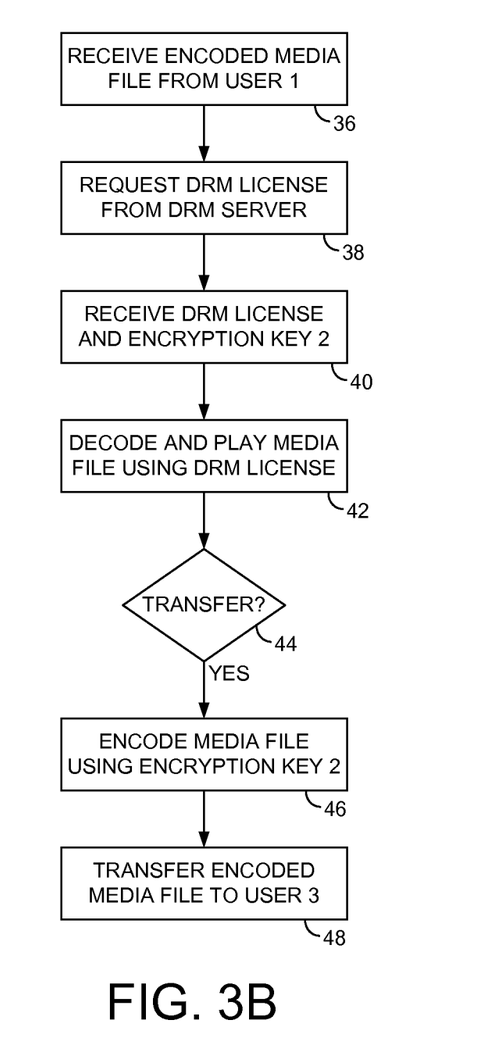
FIG. 3B is a flow diagram according to an embodiment of the present invention wherein a second user device requests a DRM license from a DRM server to decode a second media file received from a first user device.

This embodiment is understood with reference to the flow diagram of FIG. 3B wherein a second user device receives a second (encoded) media file from a first user device (block 36) using any suitable technique (Internet, Bluetooth, storage medium, cabled connection, etc.). The second user device requests a DRM license from the DRM server (block 38), and receives a DRM license including a second encryption key (block 40). The second user device uses the DRM license to decode and play the second media file that was received from the first user device (block 42). When the second user desires to transfer the media file, the second user device encodes the second media file into a third media file (block 46) and transfers the encoded media file to a third user device (block 48).

Figure 2C:
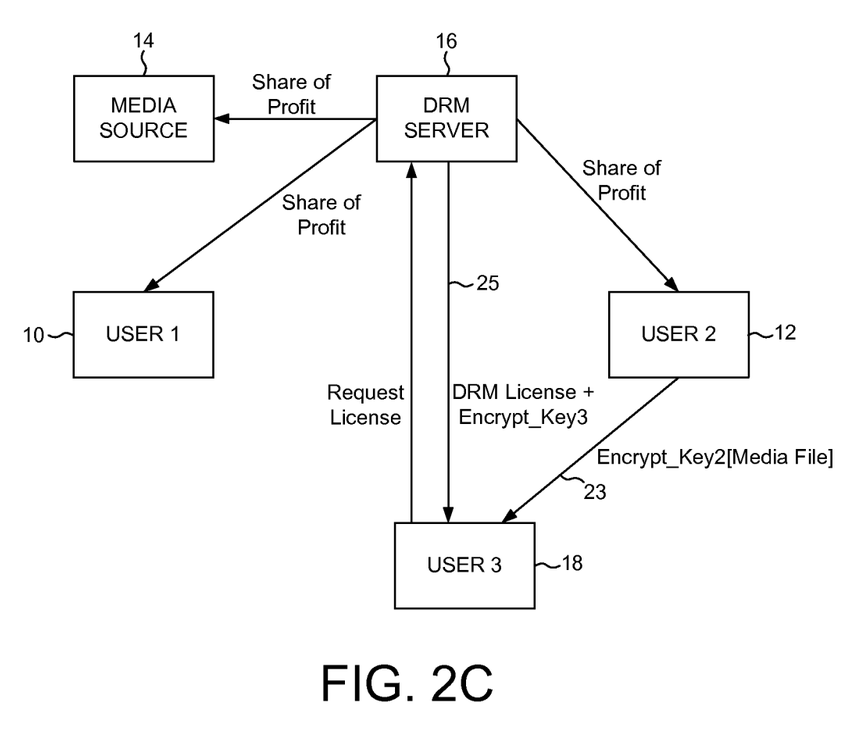
FIG. 2C shows a block diagram of an embodiment of the present invention wherein the second user device encodes the second media file using the second encryption key to generate a third media file transmitted to a third user device that requests a third DRM license and a third encryption key corresponding to the third media file from the DRM server.

Referring to the embodiment of FIG. 2C, when the third user device 18 receives the third media file 23 from the second user 12, the third user device 18 may request a DRM license 25 from the DRM server 16 in order to decode and play the third media file 23. The request for a DRM license may include header information extracted from the third media file 23 and transmitted to the DRM server 16 (the entire media file is not necessarily transmitted), wherein the header information may identify the media file, the user and/or device that generated the media file, etc. The DRM server 16 may also evaluate the header information of the third media file 23 to determine the chain of ownership. In this example, the DRM server 16 determines that the chain of ownership for the media file was from User 1 to User 2 to User 3. In one embodiment, the DRM server 16 maintains a transaction database entry for each user so that the users can be compensated for the distribution of the media files. In the example of FIG. 2C, the DRM server 16 may update the transaction database to credit User 1 and User 2 for the purchase of the media file by User 3 (as well as credit the media source 14). When the third user device 18 (User 3) receives the DRM license to decode the third media file 23, the third user device 18 also receives a third encryption key 25 that can be used to encode the third media file 23 into a fourth media file for further distribution to other users.

Figure 5:
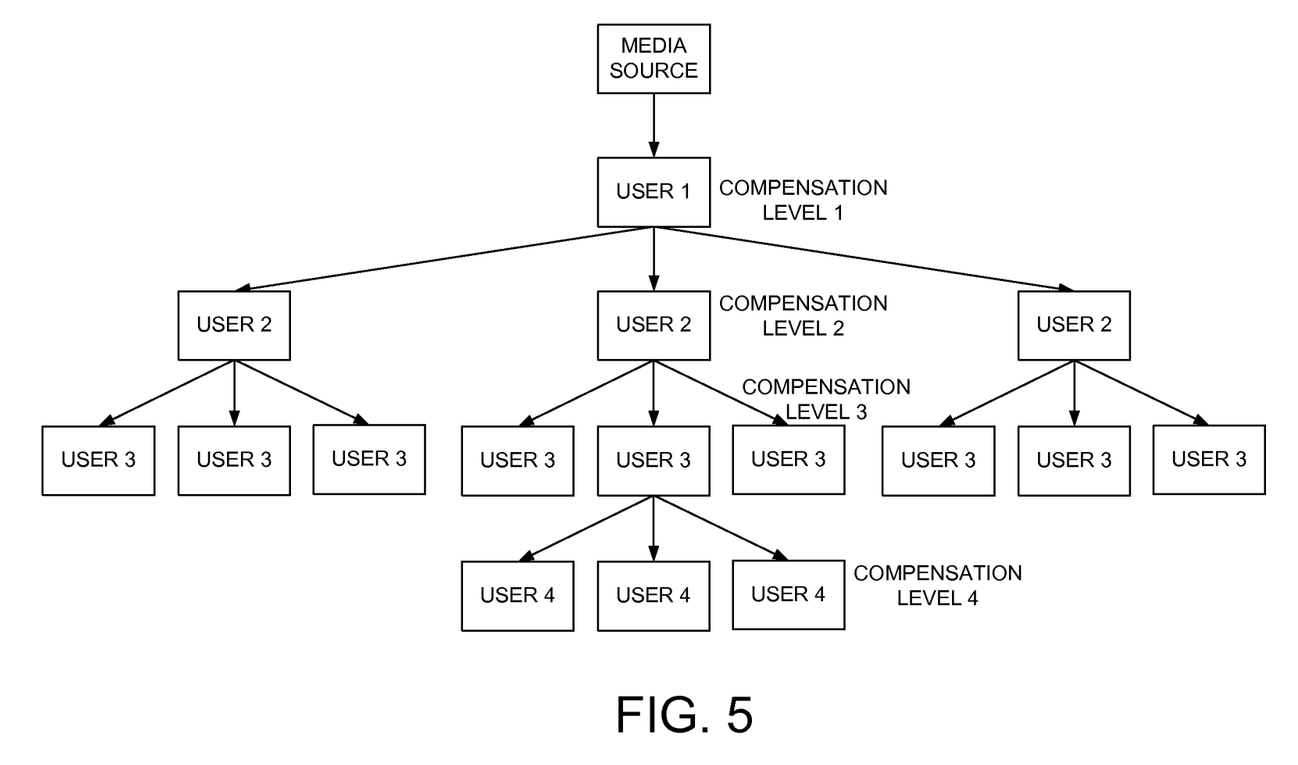
FIG. 5 shows an embodiment of the present invention wherein a distribution pyramid may be established from the distribution of media files, wherein each tier of the pyramid may be compensated for transactions at lower tiers.

The distribution model in the embodiments of the present invention incentivizes individual users to disseminate media files, which also benefits the content providers. Each individual user may distribute their encoded "version" of the media file knowing that the media file can only be decoded if other users purchase the corresponding DRM license from the DRM server which in turn credits the distributing user. In some embodiments, each individual user may be given further credit for "down stream" transactions as the file is propagated from first tier users to second tier users, to third tier users, and so on in a pyramid fashion. In an embodiment illustrated in FIG. 5, the amount credited for each transaction may vary depending on the tier of the pyramid. For example, the lowest (or bottom) tier users directly involved with the current transaction to new users may be given more credit, whereas the amount of credit is reduced accordingly for users in higher tiers that benefit indirectly from the transaction.

In order to track this information, DRM server 16 may include data storage including a database of media source 14 and user (10, 12, 18, etc.) account information. In some embodiments, the account information may include account holder identifiers, devices associated with each user, lists of media files generated or shared by the account holder, payment information, and/or the like. Payment information may include, for example, credit card information for charges and/or credits, bank account information, or the like. In some embodiments, a separate physical or logical computer system, such as a server, may control account information; the DRM server 16 would communicate with such an account server in such an embodiment.

In some embodiments, the DRM server 16 may track the history of each user, debiting each user account for each DRM license purchased, and crediting each user account for each DRM license purchased by others through a referral. On a periodic basis (e.g., at the end of each month), the DRM server 16 may balance each user account by charging a debit balance to a user's credit card, or by paying a user for a credit balance (e.g., by check or credit card account). This embodiment reduces the transaction cost, for example, by debiting/crediting a user's credit card once a month rather than for each individual transaction. In some embodiments, the DRM server 16 may implement a token system wherein each user is required to purchase an initial number of tokens that may be used to purchase DRM licenses. When a DRM license transaction is originated by one of the users (via a referral), their account is credited with a corresponding token. Each account may then be periodically balanced, for example, by requiring a user to purchase more tokens if they are running low, or by redeeming excess tokens for a cash payment.

In one embodiment, a user may transfer a media file to an acquaintance (friend, family member, etc.) using any suitable technique (Internet, Bluetooth, storage medium, wired connection, etc.). In an alternative embodiment, the user may distribute the encoded media file to unknown parties using any suitable technique, such as through peer-to-peer file-sharing services or a website that allows anyone to download the media file. For example, a user may create a website for the purpose of marketing their encoded media files for access by anyone on the Internet.

In one embodiment, a user may distribute a media file through an intermediary party that does not purchase a DRM license from the DRM server. For example, a user might transfer an encoded media file to a second user, wherein the second user may transfer the encoded media file to a third user without purchasing a DRM license from the DRM server. In one embodiment, the second user may transfer the encoded media file to the third user at it was received from the first user. If the third user purchases a DRM license from the DRM server, the ownership chain will not include the second user (and the second user is not credited for the transaction). In an alternative embodiment, the second user may request an encryption key form the DRM server without purchasing a DRM license to decode and view the media file. The second user may then encode the media file using their unique encryption key before transferring to a third user. In this manner, the second user need not purchase a DRM license but may still participate in the profit sharing pyramid shown in FIG. 5. In some embodiments, whether a user has purchased access to the media file himself may affect the amount of profit sharing to which he is entitled.

In one embodiment, a vendor may maintain a website or kiosks designed for distributing media files to consumers. The vendor may not want to purchase a DRM license for each media file but instead obtains an encryption key for each media file from the DRM server. The vendor may encode the media files with the encryption keys and then distribute the encoded media files to consumers. If a consumer in turn purchases a DRM license for the encoded media file from the DRM server, the DRM server credits the vendor from the proceeds of the sale (e.g., pays the vendor a percentage of the sale price).

In one embodiment, an encoded media file may only be transmitted to a user that is a member of a network of users registered with the DRM server. In other words, only users that are registered with the DRM server may request a DRM license for decoding and viewing an encoded media file. Registering users may be implemented in any suitable manner, wherein in one embodiment each registered user is assigned a user id and password for logging into the DRM server. For example, in one embodiment the DRM server may charge a membership fee in order to become a registered user, wherein the membership fees may be used to compensate the owner of the DRM server and/or used to compensate the users in the distribution pyramid. In one embodiment, when a new user registers with the DRM server to obtain a DRM license for an encoded media file, the DRM server may compensate the "referrer" user in the distribution pyramid with a portion of the new membership fee.

Figure 2D:
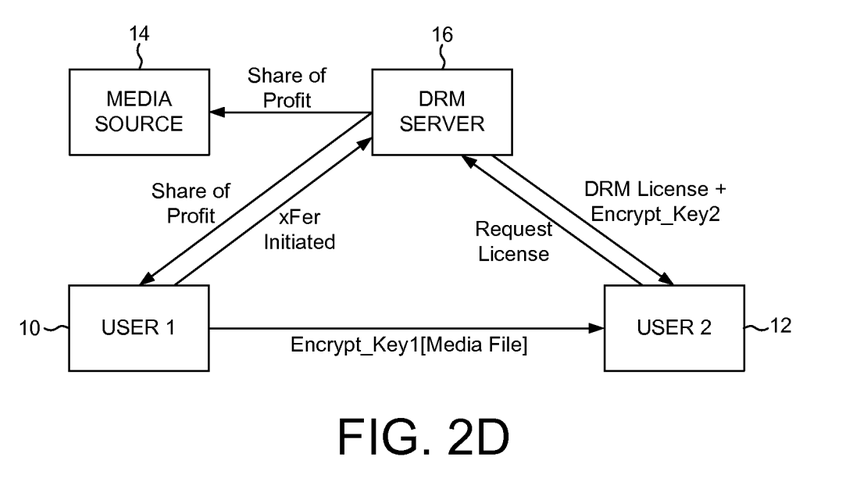
FIG. 2D shows a block diagram of an embodiment of the present invention wherein when a first user device transfers the second media file to the second user device, it transmits an identifier to the DRM server indicating that the second media file has been transmitted to the second user device.

In one embodiment, when a first user device transfers an encoded media file to a second user device, the first user device notifies the DRM server of the transfer (FIG. 2D). This embodiment may help the DRM server verify the ownership chain when a DRM license is requested, as well as track the location of encoded media files. For example, if a user device becomes a sink for numerous encoded media files but purchases only a few DRM licenses, it may indicate the user device has defeated the encryption algorithm and is accessing the media files for free. In another embodiment, the DRM server may not allow a registered user to purchase a DRM license unless there is an entry in the database identifying the source of the media file (i.e., the user device the media file was received from). This embodiment may help control the distribution of the media files by ensuring the media files are transferred only between registered users of the DRM server.

The embodiments of the present invention may include various protection measures that help prevent a user from transferring decoded media files to other users (or an encoded media file and the corresponding decryption key received in a DRM license). In one embodiment, the user devices that decode the media files may be designed so as to prevent the transfer of a decoded media file. For example, each user device may comprise a High Definition Multimedia Interface (HDMI) that outputs an un-recordable stream to an HDMI input device (display device, music player, etc.). The user devices may be designed so that the output at the HDMI interface is the only instance of the decoded media file. In other embodiments, the decryption key for decoding a media file may be "hidden" such that only certain hardware or software components within each user device can deploy the decryption key which helps prevent the transfer of the decryption key to other users. In yet other embodiments, each user device must be in communication with the DRM server when decoding and playing a media file (e.g., using a suitable handshaking protocol) which enables the DRM server to track and authorize each decoding.

Figure 4:
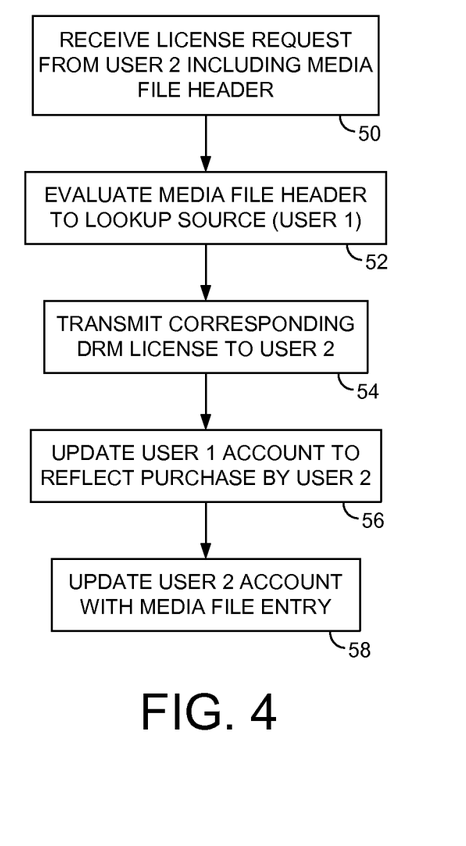
FIG. 4 is a flow diagram according to an embodiment of the present invention wherein a DRM server receives a request from a second user device to decode a media file encoded by a first user device.

FIG. 4 is a flow diagram executed by control circuitry within the DRM server according to an embodiment of the present invention. The DRM server receives a license request from a second user device for an encoded media file (block 50). In this embodiment, the second user device includes header information from the encoded media file with the license request. The DRM server evaluates the header information (block 52) to lookup the source (as well as the chain of ownership) for the encoded media file. The DRM server may optionally evaluate a transaction database to verify that the encoded media file was transferred to the second user device by a registered user device as described above. The DRM server generates a decryption key based on the source of the encoded media file (the user device that encoded the media file) and transmits the DRM license (including a decryption key and an encryption key) to the second user device (block 54). The DRM server updates the account for the source user (e.g., User 1) to reflect the purchase of the media file by the second user device (block 56). The DRM server updates (or creates) an account for the second user device (block 50) so that future DRM license requests for the media file by other users may be traced back to the second user device when appropriate.

The control circuitry in the user devices as well as the DRM server may comprise any suitable circuitry, such as one or more integrated circuits. In one embodiment, the control circuitry comprises a processor for executing code segments of a control program stored on any suitable computer readable storage medium, such as a semiconductor memory, disk storage medium (CD, magnetic, etc.), solid state drive, etc.

Although the foregoing has been described in terms of certain embodiments, other embodiments will be apparent to those of ordinary skill in the art from the disclosure herein. For example, in alternative embodiments, user compensation schemes may comprise a points program, rather than a direct monetary share of profit. The points may be accumulable and redeemable for media file licenses, money, prizes, or other awards. Alternatives to embody aspects of the invention in certain embodiments, such as the control circuitry discussed above, may include combinations of hardware and/or software running on a general or special purpose processor. As a consequence, the system and method of the present invention may be embodied as software which provides such programming, such as a set of instructions and/or metadata embodied within a computer readable medium. The described embodiments have been presented by way of example only and are not intended to limit the scope of the disclosure. Indeed, the novel methods and systems described herein may be embodied in a variety of other forms without departing from the spirit thereof. Thus, the invention is not limited by any preferred embodiments, but is defined by reference to the appended claims.

What is claimed is:

1. A method of transferring an encrypted media file from a first user device to a second user device and to a third user device, the method comprising:
   by the first user device:
      receiving a first media file encoded using a first encryption key;
      receiving a first digital rights management (DRM) license from a DRM server, the first DRM license including a first DRM license key for encoding the first media file and a first decryption key for decoding the first media file, the first DRM license key being different than the first encryption key used to encode the first media file;
      encoding the first media file into a second media file using the first DRM license key of the first DRM license, the first decryption key of the first DRM license being not operable to decode the second media file;
      transferring the second media file to the second user device and causing the second user device to request a second DRM license including a second decryption key associated with the first DRM license key, the second decryption key operable to decode the second media file for playback;
      obtaining a first credit in response to the second user device requesting the second DRM license; and
      obtaining a second credit that is less than the first credit in response to:
         the second user device transferring to the third user device a third media file, the third media file comprising the second media file encoded with a second DRM license key of the second DRM license, and
         the third user device requesting a third DRM license configured to decode the third media file;
   by the second user device:
      receiving the second DRM license from the DRM server, the second DRM license including the second DRM license key for encoding the second media file;
      encoding the second media file into the third media file using the second DRM license key of the second DRM license;
      transferring the third media file to the third user device, and causing the third user device to request the third DRM license including a third decryption key associated with the second DRM license key, the third decryption key operable to decode the third media file for playback; and
      obtaining a third credit in response to the third user device requesting the third DRM license, wherein the third credit is greater than the second credit; and
   by the third user device:
      transmitting header information for the third media file to the DRM server, the header information for the third media file identifying the first user device and the second user device,
   wherein values of the second credit and the third credit are determined based on the header information for the third media file.

2. The method as recited in claim 1, further comprising:
   by the first user device:
      decoding the first media file using the first decryption key of the first DRM license; and
      playing the decoded media file.

3. The method as recited in claim 1, further comprising, by the first user device, transmitting to the DRM server an identifier identifying the second user device.

4. The method as recited in claim 1, further comprising:
by the second user device:
  receiving the second DRM license from the DRM server;
  decoding the second media file using the second decryption key of the second DRM license; and
  playing the decoded media file.

5. The method as recited in claim 4, further comprising, by the second user device, transmitting header information for the second media file to the DRM server, wherein:
  the header information for the second media file identifies the first user device; and
  a value of the first credit is determined based on the header information for the second media file.

6. The method as recited in claim 1, wherein the header information for the third media file further identifies the third media file.

7. A digital rights management (DRM) server comprising:
  means for receiving from a first user device a first request associated with at least one of playing a first media file encoded using a first key or transferring media data of the first media file to a second user device;
  means for, in response to the first request, transmitting to the first user device a first DRM license including a first DRM license encryption key to encode, by the first user device, the first media file into a second media file, the first DRM license further including a first decryption key to decode the first media file, the first DRM license encryption key being different than the first key, and the first decryption key of the first DRM license being not configured to decode the second media file;
  means for receiving from the second user device a second request associated with at least one of playing the second media file or transferring the media data to a third user device;
  means for, in response to the second request, transmitting to the second user device a second DRM license including a second decryption key associated with the first DRM license encryption key, the second decryption key configured to enable the second user device to decode the second media file;
  means for receiving from the second user device a first header associated with the second media file, the first header identifying the first user device;
  means for determining an amount of a first credit based on the first header;
  means for providing to the first user device the first credit in response to the second user device requesting the second DRM license;
  means for providing to the first user device a second credit smaller than the first credit in response to receiving a request from the third user device for a third DRM license configured to decode a third media file transferred to the third user device by the second user device, the third media file comprising the second media file encrypted with a second DRM license encryption key of the second DRM license, wherein the second DRM license encryption key is configured to enable the second user device to encode the second media file into the third media file to transfer the third media file from the second user device to the third user device;
  means for, in response to receiving from the third user device a request for playback of the media data, transmitting to the third user device the third DRM license including a third decryption key associated with the second DRM license encryption key, the third decryption key configured to permit the third user device to decode the third media file to play the media data on the third user device;
  means for providing to the second user device a third credit in response to the third user device requesting the third DRM license, wherein the third credit is larger than the second credit; and
  means for receiving from the third user device a second header associated with the third media file, the second header identifying the first user device and the second user device,
  wherein amounts of the second credit and the third credit are determined based on the second header.

8. The DRM server as recited in claim 7, further comprising means for receiving an identifier from the first user device identifying the second user device.

9. The DRM server as recited in claim 7, further comprising:
  means for receiving from the second user device data identifying the first user device as originator of the second media file; and
  means for generating the second DRM license including the second decryption key in response to determining that the data identifies the first user device as the originator of the second media file, the second decryption key further configured to permit the second user device to decode the encoding of the second media file performed by the first user device with the first DRM license encryption key included in the first DRM license transmitted to the first user device.

10. The DRM server as recited in claim 9, further comprising means for updating a datastore indicating that the second media file has been transferred from the first user device to the second user device.

11. The DRM server as recited in claim 10, further comprising means for updating the datastore indicating that the third media file has been transferred from the second user device to the third user device.

12. The DRM server as recited in claim 7, wherein the second header further identifies the third media file.

13. A method of generating a digital rights management (DRM) license, the method comprising:
  by at least one processor:
    in response to receiving over a network from a first user device a first request associated with at least one of playing on the first user device a first media file encoded using a first key or transferring the first media file to a second user device:
      transmitting over the network to the first user device a first DRM license including a first DRM license encryption key for encoding, by the first user device, the first media file into a second media file, the first DRM license further including a first decryption key for decoding the first media file for playback, the first DRM license encryption key being different than the first key, and the first decryption key of the first DRM license being not operable to decode the second media file for playback;
    in response to receiving over the network from the second user device a second request associated with at least one of playing, on the second user device, the second media file or transferring the second media file to a third user device:
      transmitting over the network to the second user device a second DRM license including a second decryption key associated with the first DRM license encryption key, the second decryption key being operable for decoding, by the second user device, the second media file for playback on the second user device, and crediting the first user device with a first credit value, wherein the first credit value is determined based on a first header of the second media file received over the network from the second user device, the first header identifying the first user device; and in response to receiving over the network from the third user device a third request associated with at least one of playing, on the third user device, a third media file or transferring the third media file to a fourth user device, the third media file comprising the second media file encrypted with a second DRM license encryption key of the second DRM license:

crediting the first user device with a second credit value less than the first credit value, and crediting the second user device with a third credit value larger than the second credit value, wherein the second DRM license encryption key is configured to encode, by the second device, the second media file into the third media file for transferring from the second user device to the third user device, wherein the second credit value and the third credit value are determined based on a second header of the third media file received over the network from the third user device, the second header identifying the first and second user devices.

14. The method as recited in claim 13, further comprising, by the at least one processor, receiving over the network an identifier from the first user device identifying the second user device.

15. The method as recited in claim 13, further comprising: by the at least one processor:

receiving over the network from the second user device data identifying the first user device as originator of the second media file; and generating the second DRM license including the second decryption key in response to determining that the data identifies the first user device as the originator of the second media file, the second decryption key further being operable to permit the second user device to decode the encoding of the second media file performed by the first user device with the first DRM license encryption key included in the first DRM license transmitted to the first user device.

16. The method as recited in claim 15, further comprising, by the at least one processor, updating a datastore indicating that the second media file has been transferred from the first user device to the second user device.

17. The method as recited in claim 11, further comprising, by the at least one processor, updating the datastore indicating that the third media file has been transferred from the second user device to the third user device.

18. The method as recited in claim 13, further comprising: by the at least one processor, in response to receiving from the third user device the third request associated with playing the third media file, transmitting to the third user device a third DRM license including a third decryption key associated with the second DRM license encryption key, the third decryption key for decoding, by the third user device, the third media file for playback on the third user device.

19. The method as recited in claim 13, wherein the second header further identifies the third media file.

* * * * *